3,517,063
HYDROGENATION OF DINITROTOLUENE TO TOLYLENE DIAMINE
Beverly R. Nason, Bridgeville, Pa., assignor to Mobay Chemical Company, Pittsburgh, Pa., a corporation of Delaware
Continuation of application Ser. No. 268,353, Mar. 27, 1963. This application Sept. 22, 1965, Ser. No. 496,228
Int. Cl. C07c 85/10
U.S. Cl. 260—580                             4 Claims

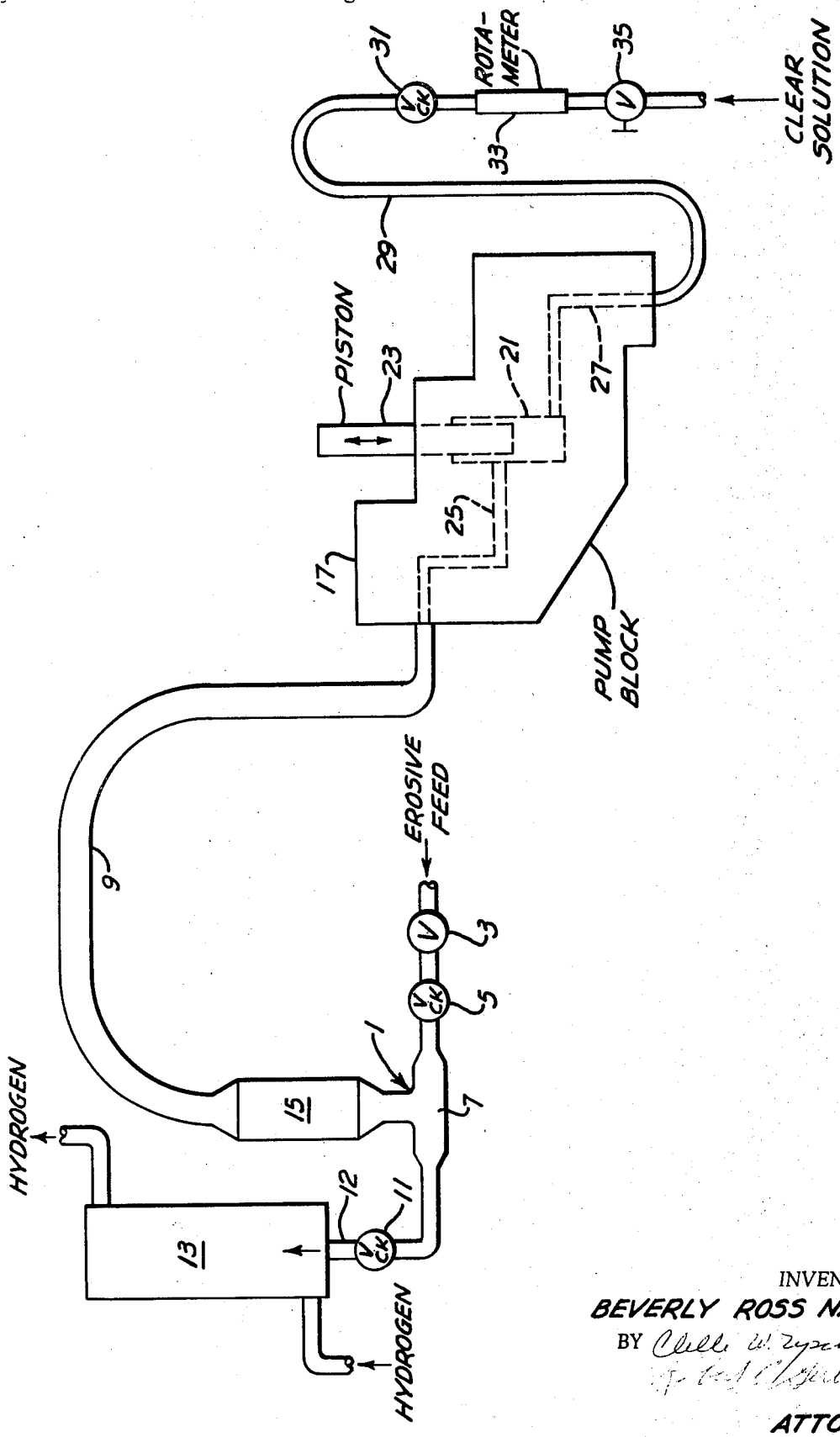

ABSTRACT OF THE DISCLOSURE

A method of supplying an organic nitro-compound-Raney nickel slurry under high pressure to a continuous hydrogenator which comprises sequentially (1) introducing a slurry of the organic nitro-compound-Raney nickel in an inert diluent into a first feed zone, (2) introducing under high pressure a further quantity of said inert diluent into said first feed zone thereby conveying said slurry in said first feed zone to a second feed zone connected directly to said hydrogenator under high pressure, (3) maintaining the high pressure in said second feed zone substantially constant and (4) relieving the pressure in said first feed zone and continuously repeating the sequence of steps set forth.

---

This invention relates to the manufacture of tolylene diamine by the hydrogenation of dinitrotoluene and more particularly to a method and apparatus for handling the highly abrasive materials encountered in such hydrogenation procedures. This application is a continuation of application Ser. No. 268,353, now abandoned.

U.S. Pat. 3,032,586 discloses a process for hydrogenating dinitrotoluene in a liquid phase by heating a liquid stream of dinitrotoluene containing particles of Raney nickel to a temperature of at least about 80° C. while subjecting the liquid to a pressure of about 50 atmospheres or more. In this method, the dinitrotoluene is dissolved or partially dissolved in a suitable solvent such as methanol and the resulting solution together with particles of Raney nickel are flowed in a continuous stream through suitable equipment operating at the temperature and pressure set forth above. This process produces tolylene diamine in high yields, with less residue and surprisingly without the hazard of explosion. By this process, temperatures up to 170° C. or higher can be used. However, in continually moving such solutions or slurries of dinitrotoluene and Raney nickel in an inert diluent under high pressures, constant replacement of equipment, such as pumps, is necessary because of the highly abrasive solution which contains not only the solid Raney nickel catalyst but also the hard crystals of dinitrotoluene. In order to overcome the disadvantage due to the solid particles of dinitrotoluene, the patentees found that the process operates efficiently when an eutectic mixture of dinitrotoluene and tolylene diamine is used as the initial starting component. This eutectic mixture has a much lower melting temperature than dinitrotoluene itself thereby removing the possibility of solid, hard crystals of dinitrotoluene being present in the moving solution. While utilization of the eutectic mixture permits the operation of the continuous hydrogenation process, it does result in a reduced capacity for the reason that a portion of tolylene diamine, i.e., the final product desired, must be used in the initial charge to the hydrogenator.

It is therefore an object of this invention to provide an improved method and apparatus for conducting the hydrogenation of dinitrotoluene. It is another object of this invention to prevent the erosion of the operating equipment used in the continuous hydrogenation of dinitrotoluene. It is still another object of this invention to provide an improved method and apparatus for supplying a dinitrotoluene-Raney nickel slurry to a hydrogenator without the associated disadvantage of high erosion to operating equipment such as pumps, valves and the like.

The foregoing objects and others which will become apparent from the following description and drawing, which illustrates one embodiment of the invention are accomplished in accordance with the invention, generally speaking, by providing a process and apparatus for continually supplying a dinitrotoluene-Raney nickel slurry to a continuous hydrogenator under extremely high pressures without having a pressure increasing means such as a pump acting directly on the highly erosive slurry. Thus, the invention contemplates a method for supplying a slurry of dinitrotoluene-Raney nickel in an inert diluent under high pressure to a continuous hydrogenator where contact with hydrogen is achieved, by sequentially conducting the steps of (1) introducing the slurry from any suitable source into a first feed zone, (2) introducing a further quantity of the inert diluent into the first feed zone under super atmospheric pressure thereby causing the slurry to move into a second feed zone, (3) maintaining the pressure in the second feed zone equivalent to that necessary in the hydrogenation of dinitrotoluene to tolylene diamine and (4) relieving the pressure in the first feed zone. This cycle of steps is continuously repeated to supply the slurry to the hydrogenator under high pressure. By this procedure, the necessary pumping apparatus to achieve the desired high pressure in the continuous hydrogenator is obtained by a pump such as a reciprocating pump which contacts only the inert diluent and not the highly erosive slurry and thereby prevents any contact of the highly erosive slurry with the moving parts of the pump.

In the method in accordance with this invention, the pressure achieved in the first feed zone and that achieved and maintained in the second feed zone must be at least 50 atmospheres, the pressure necessary in the hydrogenation step. This slurry is heated in the hydrogenator to a temperature of from about 80° C. to about 225° C. but preferably not above about 200° C.

In one embodiment of the apparatus provided by this invention, a reciprocating pump is disposed in a side arm conduit not in the path of the highly erosive slurry but which communicates therewith. The conduit between the pump and the point at which this conduit is joined with the conduit carrying the highly erosive slurry, has a volumetric capacity substantially greater than the displacement capacity of the pump. The capacity of the conduit should be at least one and one-half times greater than the displacement of the pump. This insures that the highly erosive slurry cannot flow back in the conduit and enter the pump causing damage.

In the apparatus as shown in the accompanying drawing, the dinitrotoluene-Raney nickel slurry enters the first feed zone 1 through valve 3 and check valve 5 which permits flow only in the direction indicated by the arrow. The first feed zone 1 is defined by the general area about the intersection of the first conduit 7 and the second conduit 9. The ends of the first conduit 7 are defined by the check valves 5 and 11 which permit flow only in the direction indicated. The second conduit 9 intersects the first conduit 7 at a point between the check valves 5 and 11. The material flowing through the check valve 11 passes under high pressure through the second feed zone 12 and then directly into the hydrogenation apparatus 13. The second feed zone 12 and the hydrogenator are at substantially the same pressure. The second conduit 9 contains an enlarged portion 15 which insures that the volume of the conduit 9 is greater than the displacement of the pump 17 and as a result, the highly erosive dinitrotoluene-Raney nickel slurry cannot flow back into the conduit and enter the discharge side of the pump 17. When the length of conduit 9 is great enough the enlarged portion 15 is not needed as the ratio of the volume of the conduit 9 and the cylinder 21 will be large enough. Of course, the discharge side of pump 17 is connected to the opposite end of conduit 9 from that connected to conduit 7. The pump 17 is a positive displacement pump, preferably a reciprocating type piston pump as illustrated, having a pump block 19, a cylinder 21, a piston 23 disposed to move axially within the cylinder 21, an outlet passage 25 connecting the cylinder 21 with the second conduit 9 and an inlet passage 27. The inlet passage 27 of the pump 17 is connected to a third conduit 29 having disposed in the line thereof a check valve 31 which permits flow only in the direction indicated, a rotameter 33 to indicate the rate of flow within the third conduit 29 and an adjusting needle valve 35. The third conduit 29 is connected to a source (not shown) of the inert diluent. Of course, conduit 29 can be connected to conduit 9 between the pump 17 and the enlarged portion 15 without altering the operation of the apparatus. In this embodiment there is only one passageway connected to the cylinder 21.

In operation, a slurry of dinitrotoluene-Raney nickel in methanol, for example, is introduced through valve 3 and check valve 5 into the first conduit 7. A portion of this slurry will flow a short distance back into second conduit 9 but will not be capable of reaching the pump because of the large volumetric capacity of the second conduit 9 with respect to the size of the cylinder 21 of the pump 17. The slurry enters the first conduit 7 only when the piston 23 is drawn from the cylinder 21. The slurry then present within the first feed zone 1 is prevented from moving in the reverse direction by the unidirectional check valve 5. The piston 23 is then actuated and forces the methanol in the cylinder 21 through discharge passage 25 and through the second conduit 9 under extremely high pressure forcing the slurry through unidirectional check valve 11 into the second feed zone 12 and then into the hydrogenator 13. When the piston 23 is drawn from the cylinder 21, methanol enters the cylinder through inlet passage 27 and the third conduit 29. The rate of flow of the methanol is determined by the opening of the adjusting needle valve 35 and this rate is indicated on the rotameter 33. When the piston is actuated to pump the methanol from the pump, the unidirectional check valve 31 prevents the methanol from returning back through the rotameter 33 and through adjusting needle valve 35. Thus, during the suction stroke of the piston 23, the first feed zone 1 fills with erosive slurry and simultaneously therewith, the cylinder 21 fills with methanol. On the pressure stroke, the highly erosive slurry moves from the first feed zone 1 through the first conduit 7 into the second feed zone 12 and into the hydrogenator 13. The pressure within the second feed zone 12 and the hydrogenator is maintained by the unidirectional check valve 11. It can thus be seen that by this arrangement, the highly erosive slurry is supplied to the hydrogenator at high pressures without the need for passing the slurry through a pump. The hydrogenator 13 generally consists of a battery of pressure reactors arranged in series. These pressure reactors are provided with cooling means, preferably two separate sheaves of water tubes. Also provided is a means for introducing hydrogen under substantial pressure and an outlet for hydrogen and for the product solution. The hydrogen is introduced under substantially high pressures within the range of from about 150 to about 200 atmospheres. Of course, the system can be made more elaborate by providing more than one pump together with the associated valve and piping arrangements or by utilizing a doubly acting piston pump which will pump on each stroke through separate conduits to the hydrogenator.

In order to achieve the high yields as illustrated in U.S. Pat. 3,032,586, the slurry must be maintained in the hydrogenator at a temperature of at least about 80° C. to about 225° C. and preferably from about 115° C. to about 200° C. The pressure within the hydrogenator should be at least about 50 atmospheres and preferably from about 50 atmospheres to about 200 atmospheres. The teaching of the stated patent with regard to the conditions and the like are incorporated herein by reference. Any suitable inert diluent such as, for example, dioxane or tetrahydrofuran may be used. However, it is preferred that low molecular weight alcohols such as ethanol, methanol and the like be used. Methanol is the most preferred diluent.

The invention is further illustrated by the following example in which the parts are by weight unless otherwise indicated.

EXAMPLE

A slurry of 750 parts per hour of a mixture containing methanol and dinitrotoluene in the ratio of 2:1 and having Raney nickel suspended therein is introduced into the first feed zone 1 through unidirectional check valve 5. Methanol is passed through adjusting needle valve 35 and rotameter 33 at a rate of about 250 parts per hour. This methanol solution enters cylinder 21 and is discharged therefrom on the pressure stroke of the piston 23 through discharge passage 25, second conduit 9 and forces the slurry in the first feed zone 1 through the unidirectional check valve 11 into the second feed zone 12 and then directly into the hydrogenator 13. The temperature within the hydrogenator is maintained at about 100° C. and the hydrogen pressure is maintained between about 150 and 200 atm. At the end of the system, hydrogen is withdrawn from a separator by means of a recirculating pump. The methanolic solution of the hydrogenation product is depressured, filtered and continuously freed of methanol and water. Tolylene diamine of 98% to 99% purity which is substantially free of dinitrotoluene is obtained.

It is, of course, to be understood that the example is for the purpose of illustration and not limitation in that any suitable diluent such as those mentioned above can be used in place of methanol.

While the description throughout speaks specifically of supplying a dinitrotoluene-Raney nickel slurry to a hydrogenator where it is reduced to tolylene diamine, it is to be understood that the method of this invention applies to other nitro-compounds and their reduction to the corresponding amine as well, such as, for example, alkyl nitro-, cycloalkyl nitro- and aryl nitro-compounds, such as, nitrobenzene, dinitrobenzene, dinitrodiphenyl, dinitronaphthalene, 4,4'-dinitrodiphenylmethane, dinitrohexane, dinitrocyclohexane and the like wherein either the nitro-compound itself, the catalyst or the combination of the nitro-compound and catalyst causes erosive damage to moving parts.

Although the invention has been described in considerable detail in the foregoing, it is to be understood that such detail is solely for the purpose of illustration and that many variations can be made by those skilled in the art without departing from the spirit and scope of the invention.

What is claimed is:

1. A method of supplying an organic nitro-compound-Raney nickel slurry under a high pressure to a continuous hydrogenator which comprises sequentially (1) introducing a slurry of the organic nitro-compound-Raney nickel in an inert diluent into a first feed zone, (2) introducing under high pressure of at least 50 atmospheres a further quantity of said inert diluent into said first feed zone thereby conveying said slurry in said first feed zone to a second feed zone connected directly to said hydrogenator under high pressure, (3) maintaining the high pressure in said second feed zone substantially constant and (4) relieving the pressure in said first feed zone and continuously repeating the sequence of steps set forth wherein the organic nitro-compound is a member selected from the group consisting of alkyl nitro-, cycloalkyl nitro- and aryl nitro-compounds.

2. The method of supplying a normally erosive slurry of dinitrotoluene and Raney nickel in an inert diluent through a conduit under high pressure to a hydrogenator which comprises simultaneously (1) drawing said slurry into a first feed zone in fluid flow relationship with a pump and connected to said pump by a conduit having a volume greater than the volume of the cylinder of said pump and (2) drawing an inert diluent into the cylinder of said pump on the suction stroke of the piston of said pump, expelling the diluent from the cylinder of said pump on the pressure stroke of the piston through said conduit thereby forcing said slurry from said first feed zone into a second feed zone and into a hydrogenator under a pressure of at least 50 atmospheres and maintaining the pressure in said second feed zone.

3. A method of supplying a dinitrotoluene-Raney nickel slurry under high pressure to a continuous hydrogenator which comprises sequentially (1) introducing a slurry of dinitrotoluene and Raney nickel in an inert diluent into a first feed zone, (2) introducing under high pressure of at least 50 atmospheres a further quantity of said inert diluent into said first feed zone thereby conveying said slurry in said first feed zone to a second feed zone connected directly to said hydrogenator under high pressure, (3) maintaining the high pressure in said second feed zone substantially constant and (4) relieving the pressure in said first feed zone and continuously repeating the sequence of steps set forth.

4. The method of claim 1 wherein the organic nitro-compound of the slurry is a member selected from the group consisting of nitrobenzene, dinitrobenzene, dinitrodiphenyl, dinitronaphthalene, 4,4'-dinitrodiphenylmethane, dinitrohexane and dinitrocyclohexane.

References Cited

UNITED STATES PATENTS

| | | | |
|---|---|---|---|
| 2,578,328 | 12/1951 | Von Bramer et al. | 260—580 |
| 2,620,356 | 12/1952 | Munday | 260—580 |
| 3,032,586 | 5/1962 | Dierichs et al. | 260—580 |

CHARLES B. PARKER, Primary Examiner

R. L. RAYMOND, Assistant Examiner

U.S. Cl. X.R.

137—13, 565; 260—563, 583